US011926065B2

United States Patent
Pan et al.

(10) Patent No.: US 11,926,065 B2
(45) Date of Patent: Mar. 12, 2024

(54) VISION-BASED OPERATION FOR ROBOT

(71) Applicant: ABB Schweiz AG, Baden (CH)

(72) Inventors: Wengui Pan, Shanghai (CN); Bojun Ma, Shanghai (CN); Yanjun Wang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 609 days.

(21) Appl. No.: 16/941,988

(22) Filed: Jul. 29, 2020

(65) Prior Publication Data

US 2020/0353624 A1    Nov. 12, 2020

Related U.S. Application Data

(63) Continuation of application No. PCT/CN2018/074961, filed on Feb. 1, 2018.

(51) Int. Cl.
*B25J 9/16* (2006.01)
*B25J 19/02* (2006.01)
*G05B 19/416* (2006.01)

(52) U.S. Cl.
CPC ........... *B25J 9/1697* (2013.01); *B25J 9/1651* (2013.01); *B25J 9/1664* (2013.01); *B25J 9/1689* (2013.01);
(Continued)

(58) Field of Classification Search
CPC ...... B25J 9/1697; B25J 9/1651; B25J 9/1664; B25J 9/1689; B25J 9/1656; B25J 19/023;
(Continued)

(56) References Cited

U.S. PATENT DOCUMENTS 9,579,088 B2   2/2017 Farritor et al.
2006/0184272 A1  8/2006 Okazaki et al.
(Continued)

FOREIGN PATENT DOCUMENTS

CN     1047750 A    12/1990
CN   101803952 A     8/2010
(Continued)

OTHER PUBLICATIONS

Intellectual Property Office of the P.R. China, International Search Report & Written Opinion issued in corresponding Application No. PCT/CN2018/074961, dated Nov. 7, 2018, 9 pp.
(Continued)

*Primary Examiner* — Abby Y Lin
*Assistant Examiner* — Dylan Brandon Mooney
(74) *Attorney, Agent, or Firm* — Greenberg Traurig, LLP

(57) ABSTRACT

Embodiments of the present disclosure relates to an electronic device, a vision-based operation method and system for a robot. The electronic device includes at least one processing unit; and a memory coupled to the at least one processing unit and storing computer program instructions therein, the instructions, when executed by the at least one processing unit, causing the electronic device to perform acts including: obtaining an image containing a tool of a robot and an object to be operated by the tool, the image being captured by a camera with a parameter, obtaining a command for operating the tool, the command generated based on the image; and controlling the robot based on the command and the parameter. Embodiments of the present disclosure can greatly improve the accuracy, efficiency and safety of an operation of a robot.

16 Claims, 2 Drawing Sheets

(52) U.S. Cl.
CPC .......... *B25J 19/023* (2013.01); *G05B 19/416* (2013.01); *G05B 2219/39392* (2013.01)

(58) Field of Classification Search
CPC .......... G05B 2219/39392; G05B 2219/40609; G05B 19/42; G05B 19/416
See application file for complete search history.

(56) References Cited

U.S. PATENT DOCUMENTS

| | | | |
|---|---|---|---|
| 2007/0073439 | A1 | 3/2007 | Habibi et al. |
| 2012/0050256 | A1* | 3/2012 | Thiel .................... H04N 13/156 |
| | | | 345/419 |
| 2013/0331644 | A1* | 12/2013 | Pandya ................. A61B 34/30 |
| | | | 600/102 |
| 2014/0012416 | A1 | 1/2014 | Negishi et al. |
| 2014/0121836 | A1 | 5/2014 | Ban |
| 2016/0374541 | A1 | 12/2016 | Agrawal et al. |
| 2017/0080574 | A1* | 3/2017 | Kuroda ................. H04N 23/57 |
| 2017/0119466 | A1 | 5/2017 | Hirvonen et al. |
| 2017/0270612 | A1* | 9/2017 | Howe ................ G06Q 30/0278 |
| 2018/0132953 | A1* | 5/2018 | Neupert ................... B25J 9/161 |
| 2019/0275679 | A1* | 9/2019 | Kuroda ................. A61B 34/30 |

FOREIGN PATENT DOCUMENTS

| | | | |
|---|---|---|---|
| CN | 102477396 | A | 5/2012 |
| CN | 104588837 | A | 5/2015 |
| CN | 104954661 | A | 9/2015 |
| CN | 106132346 | A | 11/2016 |
| CN | 106238969 | A | 12/2016 |
| CN | 106256512 | A | 12/2016 |
| CN | 107073719 | A | 8/2017 |
| JP | H0811071 | A * | 1/1996 |
| JP | H0811071 | A | 1/1996 |
| JP | 4262389 | B2 | 5/2009 |
| JP | 2011104706 | A | 6/2011 |
| WO | 2016019489 | A1 | 2/2016 |
| WO | 2017115227 | A1 | 7/2017 |

OTHER PUBLICATIONS

Extended European Search Report, issued by the European Patent Office, regarding corresponding patent application Serial No. EP18903719.5; dated Sep. 14, 2021; 14 pages.

First Office Action, issued by the China National Intellectual Property Administration, regarding corresponding patent application Serial No. 201880088249.9; dated Sep. 30, 2022; 12 pages.

* cited by examiner

VISION-BASED OPERATION FOR ROBOT

FIELD

Embodiments of present disclosure generally relate to the field of industrial robots, and more particularly, to an electronic device, a vision-based operation method and system for a robot.

BACKGROUND

With the development of science and technology in the field of micro-machining and ultra-precision machining, the object to be manipulated by a robot extends from the macro field to the submicron and nano-scale micro field. For example, a robot is sometimes required to thread a needle. A human operator usually operates a robot using a Teach Pendant Unit (TPU). In a manual mode, the robot is commanded to some specified position through the jogging function button on the TPU.

Micro-operation of a robot means a human operator controls the robot to move to fine positions within a small space. For example, the small space is at a level of micron. This operation requires high motion accuracy of the robot and extremely careful operation of the operator. For example, to teach a tool of a robot accurately, the tip of the tool is required to be aligned with a reference tip accurately. Traditional approaches are inefficient as they need people to keep eyes close to the tips and push a joy-stick or another control device cautiously. It leads to a high safety risk when keeping human eyes close to the tips.

In fact, the motion accuracy of a current robot is generally 0.05 mm, which is almost impossible for human eyes to reach. Furthermore, a control device such as a joy-stick is designed for a general operation, and it is a big challenge for operator to control the robot to move at a suitable speed in the small space.

Therefore, there is a need for a micro-operation system to improve human viewing and controlling of a robot that can increase the efficiency and accuracy of a micro-operation effectively and make the robot operation safer for a human operator.

SUMMARY

In a first aspect of the present disclosure, an electronic device is provided. The electronic device comprises at least one processing unit; and a memory coupled to the at least one processing unit and storing computer program instructions therein, the instructions, when executed by the at least one processing unit, causing the electronic device to perform acts including: obtaining an image containing a tool of a robot and an object to be operated by the tool, the image being captured by a camera with a parameter; obtaining a command for operating the tool, the command generated based on the image; and controlling the robot based on the command and the parameter.

In some embodiments, the instructions, when executed by the at least one processing unit, cause the electronic device to perform acts including: causing the image to be displayed to a user.

In some embodiments, the parameter is related to a size of a field of view of the camera, and wherein controlling the robot comprises: in response to the size decreasing, controlling the tool to move with a decreased speed; and in response to the size increasing, controlling the tool to move with an increased speed.

In some embodiments, the parameter is related to a distance between the camera and the tool, and wherein controlling the robot comprises: in response to the distance decreasing, controlling the tool to move with a decreased speed; and in response to the distance increasing, controlling the tool to move with an increased speed.

In some embodiments, the instructions, when executed by the at least one processing unit, cause the electronic device to perform acts including: obtaining signals generated by sensors arranged on the robot; generating a further image showing a posture of the robot based on the signals; and causing the further image to be displayed to a user, wherein the command is generated based on the image and the further image.

In some embodiments, obtaining the image comprises obtaining a video containing the tool and the object.

In some embodiments, the image has a focus on a predefined reference point of the tool.

In a second aspect of the present disclosure, a vision-based operation method for a robot is provided. The method comprises: obtaining an image containing a tool of a robot and an object to be operated by the tool, the image being captured by a camera with a parameter; obtaining a command for operating the tool, the command generated based on the image; and controlling the robot based on the command and the parameter.

In some embodiments, the method further comprises causing the image to be displayed to a user.

In some embodiments, the parameter is related to a size of a field of view of the camera, and wherein controlling the robot comprises: in response to the size decreasing, controlling the tool to move with a decreased speed; and in response to the size increasing, controlling the tool to move with an increased speed.

In some embodiments, the parameter is related to a distance between the camera and the tool, and wherein controlling the robot comprises: in response to the distance decreasing, controlling the tool to move with a decreased speed; and in response to the distance increasing, controlling the tool to move with an increased speed.

In some embodiments, the method further comprises: obtaining signals generated by sensors arranged on the robot; generating a further image showing a posture of the robot based on the signals; and causing the further image to be displayed to a user, wherein the command is generated based on the image and the further image.

In some embodiments, obtaining the image comprises obtaining a video containing the tool and the object.

In some embodiments, the image has a focus on a predefined reference point of the tool.

In a third aspect of the present disclosure, a vision-based operation system for a robot is provided. The system comprises: the electronic device according to the first aspect of the present disclosure; and the camera configured to capture the image containing the tool of the robot and the object with the parameter.

In some embodiments, the system further comprises a display configured to display the image to a user.

In some embodiments, the system further comprises an input device configured to receive the command and transmit the command to the electronic device.

In a fourth aspect of the present disclosure, a computer program product is provided. The computer program product is tangibly stored in a non-transient computer readable medium and includes machine executable instructions which, when executed, cause a machine to perform the method according to the second aspect of the present disclosure.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
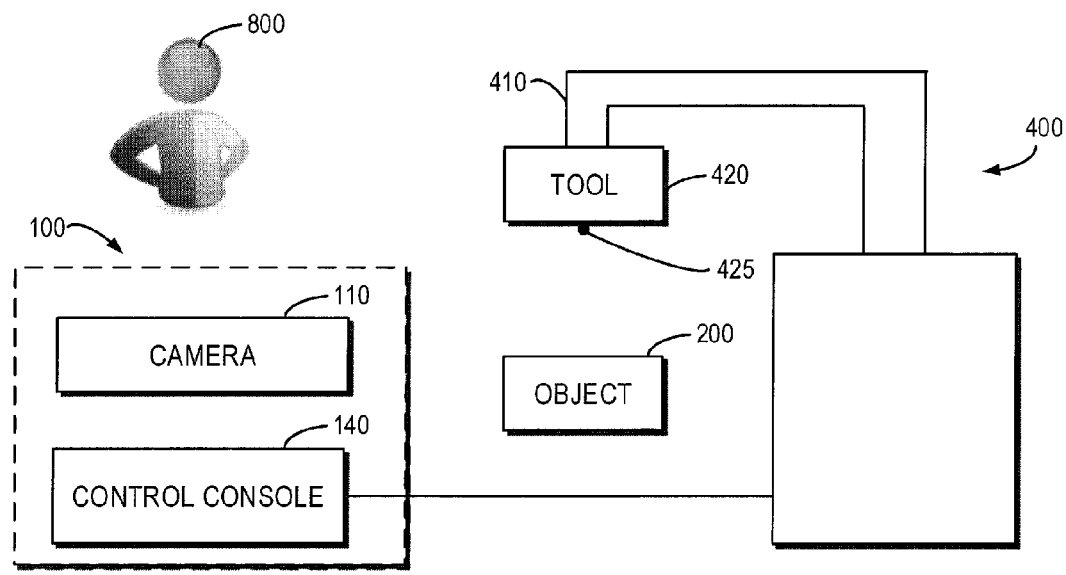
FIG. 1 schematically illustrates an application environment for a vision-based operation system for a robot according to some example embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

As used herein, the term "camera" refers to any device capable of imaging. Examples of the camera include, but are not limited to, any sensor for capturing images, a thermal imager, an infrared thermal camera, a night-vision device, and the like. An image can be obtained by measuring a physical quantity such as a temperature, a magnetic field intensity, or the like.

FIG. 1 schematically illustrates an application environment for a vision-based operation system 100 for a robot 400 according to some example embodiments of the present disclosure. As shown, the robot 400 includes a robot arm 410 and a tool 420 attached to the robot arm 410. The tool 420 can be driven by the robot arm 410 so as to move between different positions. As an example, the tool 420 may be a gripper operable to grip and drop an object 200. Of course, any other forms of the tool 420 are possible and the scope of the present disclosure is not limited thereto. In aid of the tool 420, the robot 400 can perform an operation on the object 200, which can be placed on a work table (not shown) and supported by the work table, for example. Here the operation performed on the object may include micro-operation or any other forms of operations.

According to embodiments of the present disclosure, the operation of the robot 400 is controlled by a vision-based operation system 100. The vision-based operation system 100 at least includes a control console 140 and a camera 110. As an example and without limitation, the control console 140 may be implemented as a part of a Teach Pendant Unit (TPU).

In operation, the camera 110 may capture an image containing both the tool 420 and the object 200. Then the image may be presented to a user 800. For example, the image may be presented on a display screen of the camera 110. Alternatively, or in addition, the captured image may be passed to the control console 140 and displayed on a display of the control console 140.

Given the status shown by the image, the user 800 may determine how to operate the robot 400 and then provide a command for operating the tool 420 to the control console 140. With the camera 110 to provide an image, instead of human eyes, low accuracy of an operation due to the limitation of human eyes and high safety risk when keeping human eyes close to the tool or object can be overcame, so as to greatly improve the accuracy and safety of an operation of a robot. In addition, very high-definition camera is not needed because of the semi-automatic operation. Therefore, the operation system 100 of the present disclosure is low cost.

Then the control console 140 controls the robot 400 especially the tool 420 based on not only the user's command but also one or more parameters for capturing the image. Examples of the parameter include, but are not limited to, a focal length, an exposure time, a filter, an angle of view, a size of a field of view, a distance between the camera 110 and the tool 420, and the like. With different values of one or more of these parameters, the control console 140 may control the operation of the tool 420 in different manners. As such, different from the traditional approach, the image-based operation scheme as proposed herein can avoid relying on human eyes to view a position of a tool of a robot relative to an object and control the robot 400 based on the image and the parameter with which the image is captured.

The inventors have found that when the robot 400 is relatively close to a destination, for example when the tool 420 is approaching or grasping the object 200, the image is usually captured with a smaller size of the view of field. In this case, the tool 420 should move slower to avoid collision with the object 200. Accordingly, in some embodiments, the jogging speed of the robot 400 maybe adjusted based on parameter for capturing the image. That is, if the control console 140 determines from the size of the view of field that the tool 420 is quite close to the object 200, the control console 140 may control the robot 400 to move the tool 420 with a low speed, thereby avoiding collision with the object 200.

In some embodiments, a size of a field of view of the camera 110 can be measured by the imaging parameter. In those embodiments, if the control console 140 determines from the parameter that the size of the field of view of the camera 110 decreases, the control console 140 may decrease a movement speed of the tool 420. On the other hand, if the size of the field of view is determined to increase, the control console 140 may control the tool 420 to move with a higher speed. In other words, the movement speed of the tool 420 is directly proportional to the size of the field of view of the camera 110.

Alternatively, or in addition, in some embodiments, the distance between the tool 420 and the object 200 can be measured by the parameter. If the control console 140 determines from such a parameter that the distance decreases, the control console 140 may control the tool 420 to move with a lower speed. If the distance increases, the control console 140 may instead increases the movement speed of the tool 420. In other words, the movement speed of the tool 420 is directly proportional to the distance between the tool 420 and the object 200.

In practice, the movement speed of the tool 420 can be controlled by setting the allowed maximum speed for the robot 400. The allowed maximum speed defines a maximum speed of the tool 420. When the view/image is enlarged (which means that the tool 420 is very close to the object 200), the allowed maximum robot movement speed will be decreased automatically in order to assure safety. The allowed maximum speed can be determined as below:

$$V_{max} = f(r, dis)$$

$$V_{max} \propto r, V_{max} \propto dis$$

where $V_{max}$ represents the allowed maximum speed of the robot 400 (for example, the allowed maximum movement speed of a predefined reference point 425 of the tool 420 or a joint of the robot 400); r represents the size of the field of view of the camera 110; and dis represents the distance between the camera 110 and the tool 420 (for example, the predefined reference point 425).

In this way, the robot/tool speed is restrained by the size of the field of view and/or the distance between the camera 110 and the tool 420. Smaller field of view or distance (which means larger degree of amplification and more details of robot movement) corresponds to smaller speed in robot movement. Larger field of view or distance (which means smaller degree of amplification and less details of robot movement) corresponds to larger speed in robot movement. Therefore, the tool 420 will move much slower to avoid collision with the object 200 when the tool 420 is very close to the object 200. Low efficiency of an operation due to the inconvenient speed control of a robot can be overcame, so as to greatly improve the efficiency of an operation of a robot.

Figure 2:
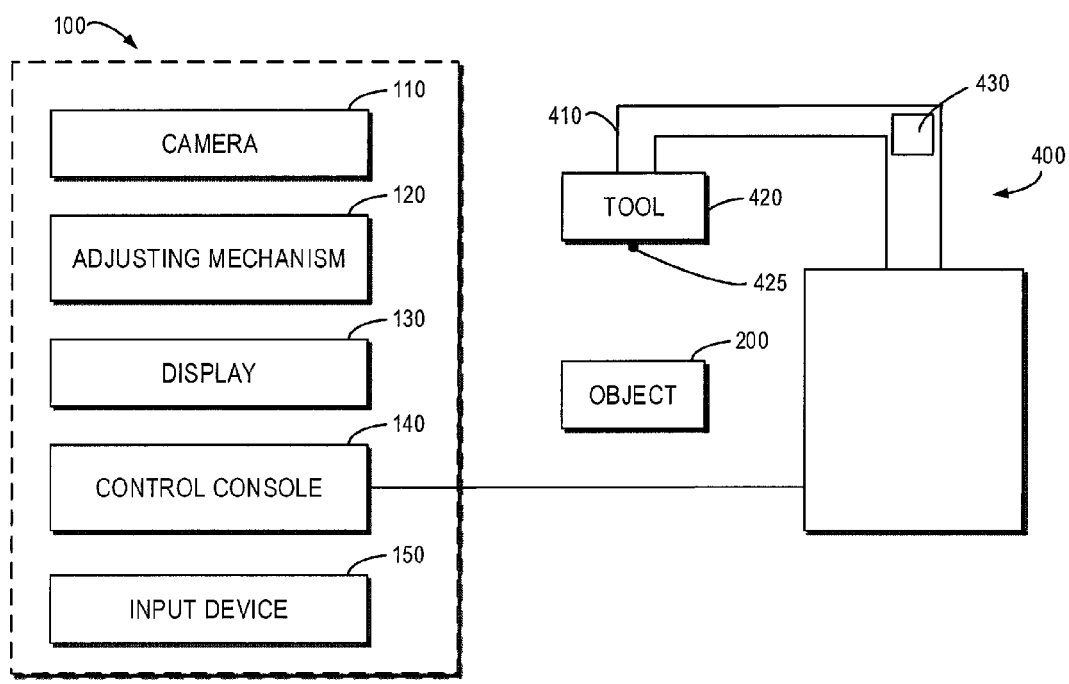
FIG. 2 schematically illustrates an application environment for a vision-based operation system for a robot according to some further example embodiments of the present disclosure.

FIG. 2 schematically illustrates an application environment for a vision-based operation system 100 for a robot 400 according to some further example embodiments of the present disclosure. As shown, besides the control console 140 and the camera 110 as described above, the operation system 100 may include an adjusting mechanism 120. The adjusting mechanism 120 may set the parameter to adjust the captured image. As an example, the adjusting mechanism 120 may include an operation keypad. The camera 110 may be connected to the control console 140 via the adjusting mechanism 120. In this way, the adjusting mechanism 120 may transmit the parameter for the camera 110 to the control console 140.

The operation system 100 may also include a display 130 to display the image to a user 800. The display 130 may be a display screen of the camera 110. Alternatively, the display 130 may be a graphical user interface (GUI) of the control console 140.

In some embodiments, the operation system 100 may also include an input device 150. The input device 150 is configured to receive the command from a user 800 and transmit the command to the control console 140. As an example and without limitation, the input device 150 may be a joy-stick. The user 800 (e.g., the human operator) may issue a command for operating the tool 420 when observing the image displayed on the display 130.

In some embodiments, the position and orientation information of the robot 400, such as the position of the predefined reference point 425 of the tool 420, can be obtained by sensors 430 arranged on the robot 400. The sensors 430 may include encoders or resolvers installed in the joints of the robot 400, which sense angle information of each joint.

In one some embodiments, sensors 430 can provide depth information. The control console 140 may obtain signals generated by sensors 430 and generate a further image based on the signals. The robot's position and orientation can be determined based on a robot model. Then the further image showing a posture of the robot 400 can be simulated. For example, a three-dimensional animation for the whole robot 400 can be generated. The control console 140 may also cause the further image to be displayed to a user 800. In this case, the command for operating the tool 420 will be generated based on both the image and the further image. In this way, the further image showing a posture of the robot 400 may assist in controlling the tool 420, to make the robot operation more accurate. The information from sensors 430 arranged on the robot 400 may be fused with the image from the camera 110. Proper fusion of the information can provide more accurate information to the user 800.

In some embodiments, in capturing the image, the focus can be set on a predefined reference point 425 of the tool 420. For example, the predefined reference point 425 may be a center point of the tool 420. During operation, the predefined reference point 425 will be aligned to the object 200 or contact the object 200. In this way, the image may provide details of the tool 420 and the object 200 in a more accurate manner.

In some embodiments, the camera 110 may capture a video containing the tool 420 and the object 200. In this way, the command is generated in real time based the video, so that the efficiency of an operation of the robot 400 can be improved.

It is to be understood that the components shown in FIG. 1 or FIG. 2 may be connected to each other in any manner, including wireless or wired connections. For example, the camera 110 may connected to the control console 140 via USB or a cable. The connection means for the camera 110 may also be used to fix the position of the camera 110. In addition, the means of control of the camera 110 is not limited herein. For example, the camera 110 may be controlled with a gesture.

Figure 3:
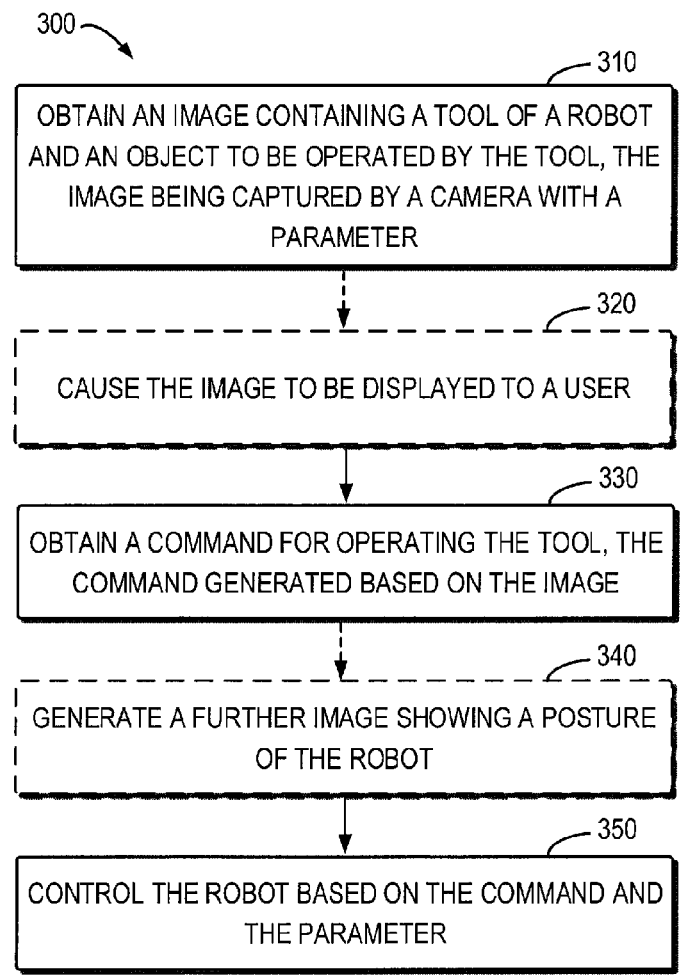
FIG. 3 is a flow chart of a vision-based operation method for a robot according to some example embodiments of the present disclosure.

FIG. 3 is a flow chart of a vision-based operation method 300 for a robot 400 according to some example embodiments of the present disclosure. For example, the method 300 can be implemented by the control console 140 shown in FIG. 1 or FIG. 2. A dashed block in FIG. 3 means an optional act. It is to be understood that the method 300 may further include additional acts not shown and/or omit some acts as shown. The scope of the present disclosure is not limited in this regard.

In block 310, an image containing a tool 420 of a robot 400 and an object 200 to be operated by the tool 420 is obtained. The image may be captured by a camera 110 with a parameter. In some embodiments, obtaining the image comprises obtaining a video containing the tool 420 and the object 200. In some embodiments, the image has a focus on a predefined reference point 425 of the tool 420.

In some embodiments, in block 320, the image may be caused to be displayed to a user 800.

In block 330, a command for operating the tool 420 is obtained. The command is generated based on the image.

In some embodiments, in block 340, the method 300 further comprises: obtaining signals generated by sensors 430 arranged on the robot 400; generating a further image showing a posture of the robot 400 based on the signals; and causing the further image to be displayed to a user 800, wherein the command is generated based on the image and the further image.

In block 350, the robot 400 is controlled based on the command and the parameter. In some embodiments, the parameter is related to a size of a field of view of the camera 110. In this case, controlling the robot 400 comprises: in response to the size decreasing, controlling the tool 420 to move with a decreased speed; and in response to the size increasing, controlling the tool 420 to move with an increased speed.

In some embodiments, the parameter is related to a distance between the camera 110 and the tool 420. In this case, controlling the robot 400 comprises: in response to the distance decreasing, controlling the tool 420 to move with a decreased speed; and in response to the distance increasing, controlling the tool 420 to move with an increased speed.

The subject matter described herein may be embodied as a computer program product. The computer program product is tangibly stored in a non-transient computer readable medium and includes machine executable instructions. The machine executable instructions which, when executed, cause a machine to perform the method 300 as described above.

Figure 4:
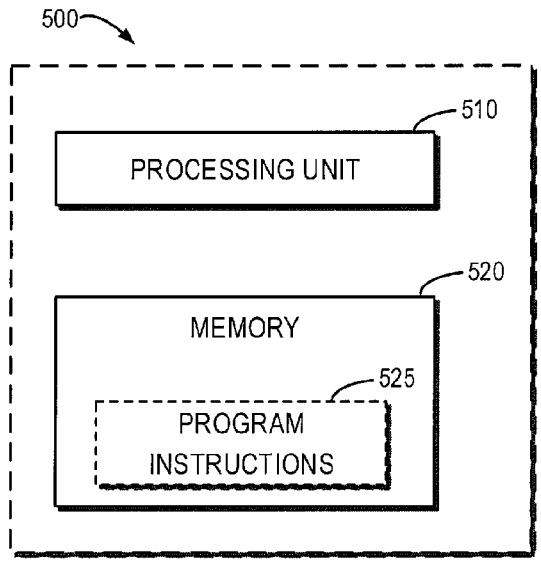
FIG. 4 is a diagram of an electronic device suitable to implement various embodiments of the present disclosure.

FIG. 4 is a diagram of an electronic device 500 suitable to implement various embodiments of the present disclosure. The electronic device 500 may be used to implement the control console 140 as shown in FIGS. 1 and 2, for example.

As shown in FIG. 4, the electronic device 500 includes at least one processing unit 510 and a memory 520. The memory 520 is coupled to the at least one processing unit 510 and stores computer program instructions 525 therein. The instructions 525, when executed by the at least one processing unit 510, cause the electronic device 500 to perform acts.

The above-described procedures and processes, such as the method 300, can be implemented by the at least one processing unit 510. For example, in some embodiments, the method 300 can be implemented as a computer software program which is tangibly embodied on a machine readable medium, for instance, the memory 520. In some embodiments, part or all of the computer program can be loaded to and/or installed on the electronic device 500 shown in FIG. 4. The computer program, when loaded and executed by the at least one processing unit 510, may execute one or more acts of the method 300 as described above. Alternatively, the at least one processing unit 510 can also be configured to implement the method 300 as described above in any other proper manner (for example, by means of firmware).

In the context of the subject matter described herein, a memory may be any tangible medium that can contain, or store a program for use by or in connection with an instruction execution system, apparatus, or device. The memory may be a machine readable signal medium or a machine readable storage medium. A memory may include but not limited to an electronic, magnetic, optical, electromagnetic, infrared, or semiconductor system, apparatus, or device, or any suitable combination of the foregoing. More specific examples of the memory would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. An electronic device, comprising:
   at least one processing unit; and
   a memory coupled to the at least one processing unit and storing computer program instructions therein, the instruction, when executed by the at least one processing unit, causing the electronic device to:
   obtain an image containing a tool of a robot and an object to be operated by the tool, the image being captured by a camera with a parameter;
   obtain signals generated by sensors arranged on the robot at one or more locations including joints of the robot;
   generate a further image showing a posture of the robot based on the signals;
   obtain a command for operating the tool, the command generated based on the image and the further image;
   determine a field of view of the image corresponding to the parameter;
   control the robot based on the command and the parameter; and
   wherein the parameter is related to a size of the field of view of the camera,
   wherein controlling the robot comprises:
   in response to the size decreasing, controlling the tool to move with a decreased speed; and
   in response to the size increasing, controlling the tool to move with an increased speed.

2. The electronic device of claim 1, wherein the instruction, when executed by the at least one processing unit, causes the image to be displayed to a user.

3. The electronic device of claim 1, wherein the parameter is related to a distance between the camera and the tool, and wherein controlling the robot comprises:
   in response to the distance decreasing, controlling the tool to move with a decreased speed; and
   in response to the distance increasing, controlling the tool to move with an increased speed.

4. The electronic device of claim 1, wherein the instructions, when executed by the at least one processing unit, cause the electronic device to:
cause the further image to be displayed to a user.

5. The electronic device of claim 1, wherein obtaining the image comprises obtaining a video containing the tool and the object.

6. The electronic device of claim 1, wherein the image has a focus on a predefined reference point of the tool.

7. A vision-based operation method for a robot, the method comprising:
obtaining a command for operating a tool, the command generated based on an image;
determining a field of view of the image corresponding to a parameter;
obtaining signals generated by sensors arranged on the robot at one or more locations including joints of the robot;
generating a further image showing a posture of the robot based on the signals; and
controlling the robot based on the command and the parameter and the further image;
wherein the parameter is related to a size of the field of view of a camera, and wherein controlling the robot comprises:
in response to the size decreasing, controlling the tool to move with a decreased speed; and
in response to the size increasing, controlling the tool to move with an increased speed.

8. The method of claim 7, further comprising:
causing the image to be displayed to a user.

9. The method of claim 7, wherein the parameter is related to a distance between the camera and the tool, and wherein controlling the robot comprises:
in response to the distance decreasing, controlling the tool to move with a decreased speed; and
in response to the distance increasing, controlling the tool to move with an increased speed.

10. The method of claim 7, further comprising:
causing the further image to be displayed to a user.

11. The method of claim 7, wherein obtaining the image comprises obtaining a video containing the tool and an object.

12. The method of claim 7, wherein the image has a focus on a predefined reference point of the tool.

13. A vision-based operation system for a robot, comprising:
an electronic device comprising:
a camera;
at least one processing unit; and
a memory coupled to the at least one processing unit and storing computer program instructions therein, the instruction, when executed by the at least one processing unit, causing the electronic device to:
obtain an image containing a tool of a robot and an object to be operated by the tool, the image being captured by the camera;
obtain signals generated by sensors arranged on the robot including a joint of the robot;
generate a further image showing a posture of the robot based on the signals;
obtain a command for operating the tool, the command generated based on the image and the further image;
determine a field of view of the image;
control the robot based on the command and a parameter; and
wherein the parameter is related to a size of the field of view of the camera,
wherein controlling the robot comprises:
in response to the size decreasing, controlling the tool to move with a decreased speed; and
in response to the size increasing, controlling the tool to move with an increased speed;
wherein the camera is configured to capture the image containing the tool of the robot and the object with the parameter.

14. The system of claim 13, further comprising a display configured to display the image and the further image to a user.

15. The system of claim 14, further comprising an input device configured to receive the command and transmit the command to the electronic device.

16. A computer program product tangibly stored in a non-transient computer readable medium and including machine executable instructions which, when executed, cause a robot to obtain an image containing a tool of the robot and an object to be operated by the tool, the image being captured by a camera with a parameter;
obtain a command for operating the tool, the command generated based on the image;
obtain signals generated by sensors arranged on the robot including a joint of the robot;
generate a further image showing a posture of the robot based on the signals; and
control the robot based on the command and the parameter and the further image;
wherein the parameter is related to a size of a field of view of the camera, and wherein controlling the robot comprises:
in response to the size decreasing, controlling the tool to move with a decreased speed; and
in response to the size increasing, controlling the tool to move with an increased speed.

* * * * *